(12) United States Patent
Elliott

(10) Patent No.: US 8,588,391 B2
(45) Date of Patent: *Nov. 19, 2013

(54) METHOD AND SYSTEM FOR AUTOMATIC UPDATE OF A LOCATION PROFILE

(75) Inventor: Bruce David Elliott, Colorado Springs, CO (US)

(73) Assignee: Verizon Business Global LLC, Basking Ridge, NJ (US)

( * ) Notice: Subject to any disclaimer, the term of this patent is extended or adjusted under 35 U.S.C. 154(b) by 252 days.

This patent is subject to a terminal disclaimer.

(21) Appl. No.: 12/943,406

(22) Filed: Nov. 10, 2010

(65) Prior Publication Data

US 2011/0051916 A1 Mar. 3, 2011

Related U.S. Application Data

(63) Continuation of application No. 12/254,523, filed on Oct. 20, 2008, now Pat. No. 7,864,935, which is a continuation of application No. 10/176,070, filed on Jun. 21, 2002, now Pat. No. 7,466,811.

(51) Int. Cl.
*H04M 3/42* (2006.01)

(52) U.S. Cl.
USPC ............... 379/201.02; 379/201.06; 455/417; 455/433

(58) Field of Classification Search
USPC ............... 379/201.02, 201.06; 455/417, 433
See application file for complete search history.

(56) References Cited

U.S. PATENT DOCUMENTS

| 5,901,211 A | 5/1999 | Dean et al. |
| 6,028,917 A * | 2/2000 | Creamer et al. ......... 379/100.01 |
| 7,006,833 B1 * | 2/2006 | Contractor ................. 455/456.1 |
| 2002/0000930 A1 | 1/2002 | Crowson et al. |
| 2002/0181684 A1 | 12/2002 | Logan |
| 2003/0059023 A1 * | 3/2003 | Crockett et al. .......... 379/220.01 |
| 2004/0162068 A1 | 8/2004 | Lamb et al. |

OTHER PUBLICATIONS

"Mobile Phone Using User-defined, Location-dependent Profiles," Research Disclosure Journal, ISSN 0374-4353, Research Disclosure Database No. 438201, two pages, Oct. 2000.

* cited by examiner

*Primary Examiner* — Quynh Nguyen

(57) ABSTRACT

An approach for establishing a communication session according to a subscriber profile that is automatically updated is disclosed. A locator device, which is associated with a subscriber and includes a Global Positioning System (GPS) transponder, outputs geographic information that is transmitted to a communications network for establishing the communication session. The geographic information corresponds to one of a plurality of addresses specified in the subscriber profile to set a current address. The addresses are associated with a plurality of devices adapted to complete the communication session. The one address is designated as the current address if the geographic information corresponds to the one address, otherwise the current address is set to a default address, wherein the communication session is established based on the current address.

20 Claims, 4 Drawing Sheets

METHOD AND SYSTEM FOR AUTOMATIC UPDATE OF A LOCATION PROFILE

RELATED APPLICATIONS

This application is a continuation of U.S. patent application Ser. No. 12/254,523, filed Oct. 20, 2008, which is a continuation of U.S. patent application Ser. No. 10/176,070, filed Jun. 21, 2002, entitled "Method and System for Automatic Update of a Location Profile"; the entireties of which are incorporated herein by reference.

FIELD OF THE INVENTION

The present invention relates to a communications system, and is more particularly related to establishing a communication session according to a profile specifying call processing instructions.

BACKGROUND OF THE INVENTION

The advancement of communication technologies and services have afforded users with the ability and convenience of remaining in continual contact via a variety of mechanisms (e.g., cellular phone, pager, voice-mail, etc.). Consequently, a typical user is associated with numerous contact addresses (e.g., numbers). This typical user, for example, has a work telephone number, a home telephone number, a pager number, a cellular phone number, a facsimile number, etc. Although greater flexibility is provided through these communication mechanisms, inefficiencies arise with respect to their management and use. In recognition of this, telecommunication service providers have developed a Find-Me/Follow-Me service that routes a call to a particular device based on a subscriber specified list of phone numbers in an attempt to reach the subscriber. The list constitutes a subscriber profile and enumerates the order of telephone numbers in which the network attempts to contact the subscriber. That is, the network forwards an incoming call to a location that is pre-designated by the subscriber. Such a service is particularly useful for individuals who need to be contacted immediately; for example, emergency personnel. Many callers are reluctant to leave voice mail messages, believing that their calls are of little import, resulting effectively in a lost call to the called party. Therefore, users who seek to not lose such calls are required to utilize a search type service, such as Find-Me/Follow-Me.

The conventional Find-Me/Follow-Me service, which employs a static subscriber profile, has a number of drawbacks. Although the subscriber profile typically designates telephone numbers in conjunction with a schedule, this schedule is fixed, and thus, lacks the flexibility to adapt to any irregularities in scheduling. For example, the network may "know" that the subscriber is typically at work from 9:00 AM to 5:00 PM, and hence, to attempt to reach the subscriber at the work telephone number during these hours, the schedule is, at best, a rough estimation. The network may need to make numerous attempts prior to contacting the subscriber, resulting in delay in call processing. Furthermore, the many attempts may unnecessarily consume precious network resources. To avoid these wastes (and accompanying costs), the subscriber is required to manually instruct the network with regard to schedule and telephone numbers. However, this approach imposes a great burden on the subscriber to continually make manual modifications to the subscriber profile.

Therefore, there is a need for an approach for providing a search type service (e.g., Find-Me/Follow-Me) with a mechanism for automatically updating a subscriber profile.

SUMMARY OF THE INVENTION

These and other needs are addressed by the present invention in which an approach is provided for automatically updating a profile to locate a subscriber to establish a communication session. The profile is utilized by a network search type service, such as Find-Me/Follow-Me, to route calls to a device accessible to the subscriber for a particular location and time. A portable subscriber locator device that is attached to the subscriber transmits location information to a network that maintains the subscriber profile. The locator device, according to one embodiment of the present invention, employs Global Positioning System (GPS) satellites to determine the position of the subscriber. The subscriber profile may be updated in real-time to track the location of the subscriber. The above approach advantageously minimizes waste of network resources and improves availability of the subscriber for direct contact.

In one aspect of the present invention, a method for establishing a communication session according to a profile of a subscriber is disclosed. The method includes receiving geographic information of the subscriber. Also, the method includes determining whether the geographic information corresponds to one of a plurality of addresses specified in the profile of the subscriber to set a current address, wherein the plurality of addresses is associated with a plurality of devices adapted to complete the communication session. Further, the method includes designating the one address as the current address if the geographic information corresponds to the one address, otherwise the current address is set to a default address. The communication session is established based on the current address.

In another aspect of the present invention, a system for automatically locating a subscriber to establish a communication session is disclosed. The system includes an interface that is configured to receive geographic information of a subscriber. The geographic information is automatically output by a locator device attached to the subscriber. The system also includes a processor that is configured to determine whether the geographic information corresponds to one of a plurality of addresses specified in a profile of the subscriber to set a current address. The plurality of addresses is associated with a plurality of devices adapted to complete the communication session, wherein the one address is designated as the current address if the geographic information corresponds to the one address, otherwise the current address is set to a default address. The communication session is established based on the current address.

In another aspect of the present invention, a computer-readable medium carrying one or more sequences of one or more instructions for establishing a communication session according to a profile of a subscriber is disclosed. The one or more sequences of one or more instructions include instructions which, when executed by one or more processors, cause the one or more processors to perform the step of receiving geographic information of the subscriber. Another step includes determining whether the geographic information corresponds to one of a plurality of addresses specified in the profile of the subscriber to set a current address, wherein the plurality of addresses is associated with a plurality of devices adapted to complete the communication session. A further step includes designating the one address as the current address if the geographic information corresponds to the one address, otherwise the current address is set to a default address, wherein the communication session is established based on the current address.

In another aspect of the present invention, a system for establishing a communication session according to a profile of a subscriber is disclosed. The system includes means for receiving geographic information of the subscriber. The system also includes means for determining whether geographic information of a subscriber corresponds to one of a plurality of addresses specified in the profile of the subscriber to set a current address, the plurality of addresses being associated with a plurality of devices adapted to complete the communication session, and for designating the one address as the current address if the geographic information corresponds to the one address, otherwise the current address is set to a default address. The communication session is established based on the current address.

In another aspect of the present invention, a method for providing automatic update of a subscriber profile is disclosed. The method includes receiving a signal indicating positional information of an intended party of a communication session. The method also includes determining whether a location site has changed in response to the received positional information. The location site corresponds to an address of a device adapted to participate in the communication session. Further, the method includes selectively transmitting a message to update the subscriber profile associated with the intended party in response to the determining step. The message indicates a changed location site.

In yet another aspect of the present invention, a computer-readable medium carrying one or more sequences of one or more instructions for providing automatic update of a subscriber profile is disclosed. The one or more sequences of one or more instructions include instructions which, when executed by one or more processors, cause the one or more processors to perform the step of receiving a signal indicating positional information of an intended party of a communication session. Another step includes determining whether a location site has changed in response to the received positional information, the location site corresponds to an address of a device adapted to participate in the communication session. A further step includes selectively transmitting a message to update the subscriber profile associated with the intended party in response to the determining step. The message indicates a changed location site.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for providing automatic update of a subscriber profile in performance of a search type service are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the present invention is explained with respect to a Find-Me/Follow-Me service, the present invention also has applicability to providing a general search type function. Additionally, the present invention is discussed with respect to an Advanced Intelligent Network (AIN) and a Global Positioning System (GPS), it should be appreciated that one of ordinary skill in the art would recognize that the present invention has applicability to other telecommunication networks, and other systems for providing geographic information.

Figure 1:
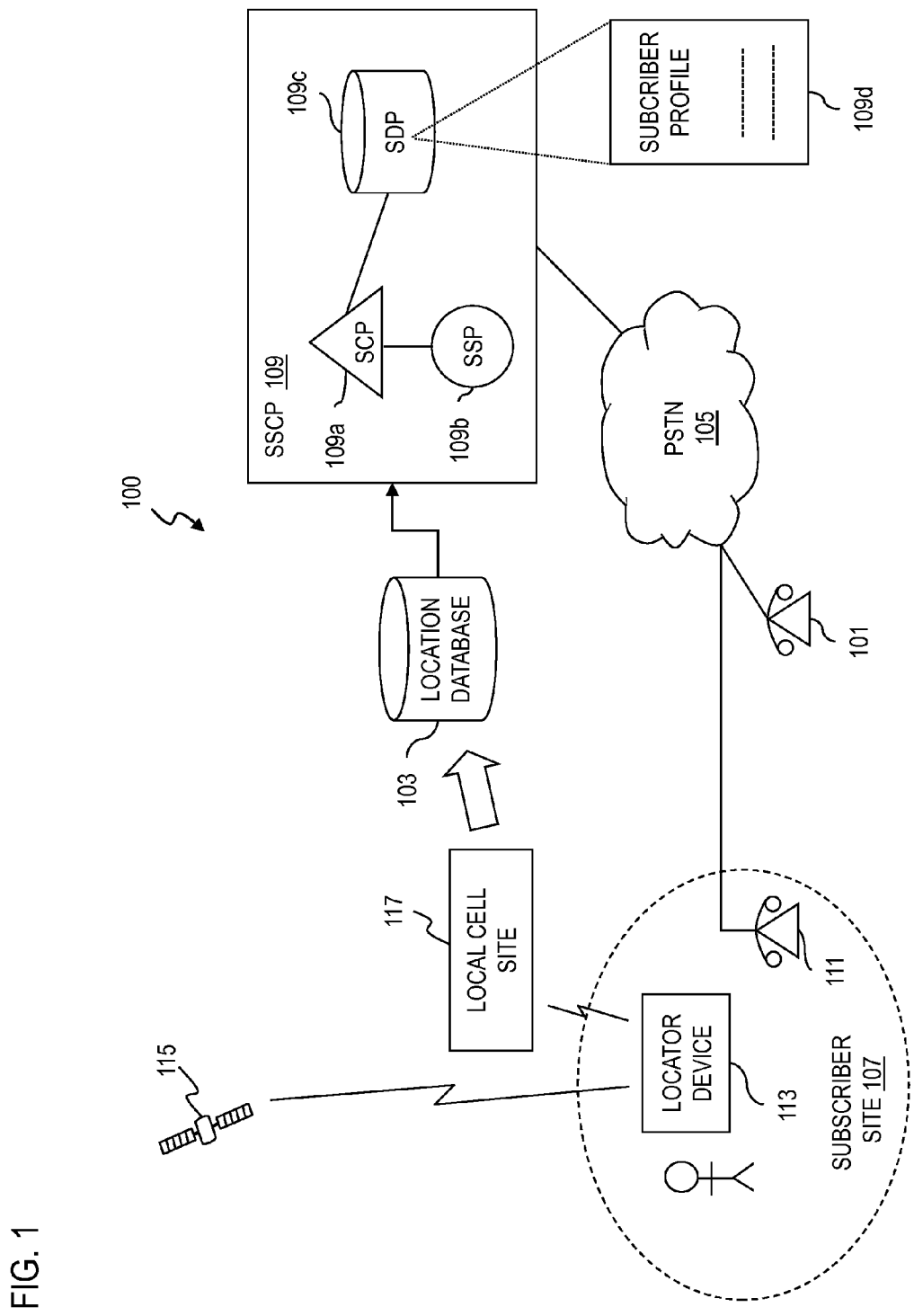
FIG. 1 is a diagram of a communication system capable of providing automatic update of a subscriber's location in a search type service, according to an embodiment of the present invention.

FIG. 1 is a diagram of a communication system capable of providing automatic update of a subscriber's location in a search type service, according to an embodiment of the present invention. A communications system 100 supports a search type service, for example, Find-Me/Follow-Me, whereby a caller utilizes a phone station 101 to reach a subscriber according to call processing instructions in a subscriber profile. In this scenario, the phone station 101 places a call over a Public Switched Telephone Network (PSTN) 105 that is intended for a subscriber within site 107. According to one embodiment of the present invention, the PSTN 105 includes an Advanced Intelligent Network (AIN) of which a Switching Service and Control Point (SSCP) 109 is shown.

AIN is an open standard architecture that separates signaling traffic from call traffic. This decoupling provides great flexibility in terms of equipment deployment and service development. Developed by Bell Communications Research, the AIN standards and concepts have also been adopted by the International Telecommunications Union (ITU) in a form referred to as Capability Set 1 (CS-1), for example.

The SSCP 109 attempts to route a call to the subscriber based on the instructions in the subscriber profile. The SSCP 109 combines the functionalities of a Switching Control Point (SCP) 109a and a Service Switching Point (SSP) 109b. The SCP 109a provides the service logic, and thus, retrieves call processing instructions from a Service Data Point (SDP)

109c, which stores the subscriber profile. The SCP 109a supports services, such as area number calling service, disaster recovery, 5-digit extension dialing, and etc.; in this example, the services of the SCP 109a include Find-Me/Follow-Me.

In general, the SSCP 109 provides technical requirements for completion of the incoming call and determines the appropriate mode of communication and network structure needed to complete the incoming call. The SSCP 109 interacts with the SCP 109a and the SSP 109b to set up desired call routing and execution. The SSCP 109 provides an endpoint under the Signaling System 7 (SS7) protocol, serving as a host based network entity that manages the network configuration. Among other functions, the SSCP 109 also coordinates network operator and problem determination requests, maintains network address and mapping tables, and provides directory support and session services. As the service logic, the SCP 109a provides translation and routing functions.

Under a Find-Me/Follow-Me service, the subscriber is assigned a telephone number, which may be a toll-free number (usually having a prefix of 800, 888 or 900). The toll-free number directs the incoming call to the SCP 109a. The SCP 109a recognizes an incoming 800 number and sends calls associated with the 800 number to the corresponding routing number.

The SSP 109b is a switch that is capable of processing an 800 number call, routing such calls to the SCP 109a. The SSP 109b utilizes a SDP database 109c, which contains pre-specified subscriber instructions that are needed to route an incoming call. In an exemplary embodiment, the SDP database 109c includes the subscriber locator profile 109d, which may be implemented as a look-up table. The subscriber profiles, for example, may be stored on the SDP 109c on optical disc, magnetic tape, or dynamic random access memory (DRAM), or other storage media. The SSP 109b comprises digital telephone switches that communicate with the SCP 109a and make requests for specific instructions for call treatment from the SDP 109c.

In this example, the call originates from the telephone station 101 for the subscriber. The call enters the PSTN 105 at a local switch (not shown), which switches the call to the SSCP 109. The SSCP 109, in turn, directs the call according to instructions of the subscriber profile stored on the SDP 109c and terminates the call at another switch within the PSTN 105 that serves the phone station 111. The phone station 111 is specified by the subscribers as the device to reach the subscriber as specified by the subscriber profile, which include a list of pre-arranged call processing instructions from the subscriber regarding the manner in which incoming calls are to be forwarded (i.e., the subscriber profile).

Upon receiving an incoming call from the phone station 101, the SCP 109a queries the SDP 109c. During the query, the SSCP 109 processes the stored instructions to route the call. For instance, the subscriber profile database may specify the following call treatment. The call is to be forwarded first to the phone in the subscriber's place of residence, then the office telephone, the cellular telephone, the pager, and then the fax machine (as a default). The subscriber profile may further instruct call treatment based on time-of-day, time-of-week, or any subscriber specified time schedule. For instance, the Subscriber profile database may be instructed to forward calls intended for the subscriber arriving between the hours of 9:00 AM and 5:00 PM be sent to the subscriber's office telephone, while all other calls during this period are forwarded to the subscriber's home telephone. Assuming the site 107 is the subscriber's office, if the phone station 101 initiates call establishment at 10:00 AM, then the PSTN 105 would route the call to a phone 111 within the subscriber site 107.

As noted, the system 100 supports automatic update of the subscriber profile. This update, which may be performed on a real-time basis, according to one embodiment of the present invention, employs a locator device 113 that is transported with the subscriber. The subscriber may carry the locator device 113, which may include, in an exemplary embodiment, a Global Positioning System (GPS) transponder (not shown) that receives positional information from GPS satellites 115. The Global Positioning System utilizes a constellation of satellites, whereby each satellite transmits signals indicating various information about itself, such as its position, its local time of day, its identification, etc. Using several GPS satellites as reference points, the GPS transponder determines positional information of the locator device 113, and thus, the subscriber. Alternatively, the locator device 113 can include an electronic compass system for determining positional information, as well as an interface for the subscriber to manually enter a location, such as an address, landmark, etc.

In turn, the locator device 113 may transmit the positional information wirelessly, for example, using cellular technology to a local cellular site 117, which relays the information to a location database 103, which interfaces with the SSCP 109 to modify the subscriber profile in the SDP 109c, as appropriate. It is recognized that the locator device 113 may also forward the positional information through a wireline (not shown). Under this approach, the subscriber profile within the database 103 may be updated in real-time. Alternatively, the locator device 113 may periodically transmit the updated positional information. In the alternative, the locator device 113 may first determine whether the positional information has changed and transmits the updated positional information only if the positional information triggers a different subscriber site 107.

According to one embodiment of the present invention, the locator device 113 forwards the positional information that is received to the location database 103 without significant processing of the positional information. In the alternative, the locator device 113 may convert the positional information to correlated data to minimize processing and storage requirement.

Although the search type service (e.g., Find-Me/Follow-Me) is described with respect to an AIN environment, it is recognized that the present invention may be deployed in any environment that implements a search type service based on a profile. For example, a search type service function may be supported in a Voice over Internet Protocol (VoIP) system.

Figure 2:
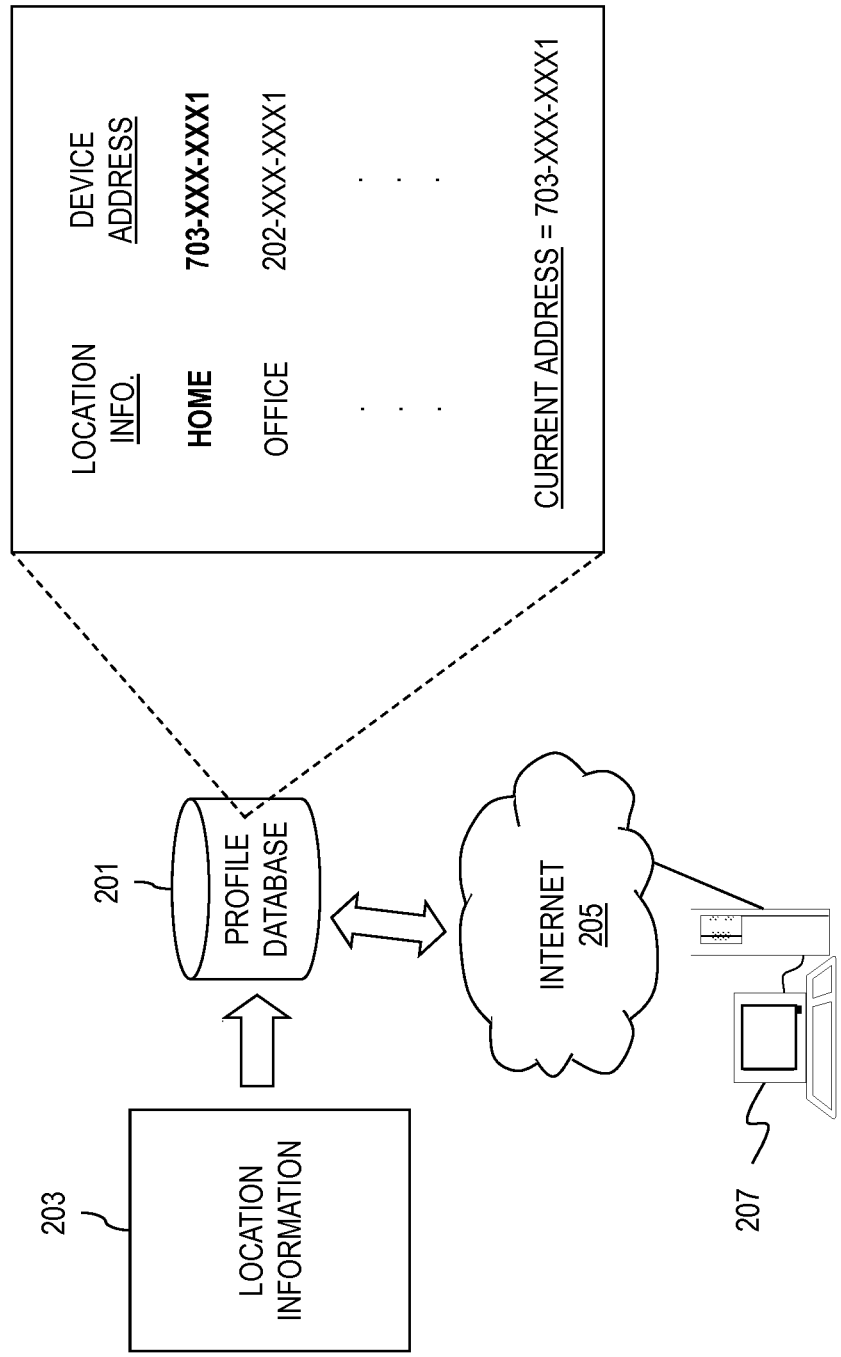
FIG. 2 is a diagram of a communication system providing a web-based interface for manipulating a subscriber profile, according to an embodiment of the present invention.

FIG. 2 is a diagram of a communication system providing a web-based interface for manipulating user profile, according to an embodiment of the present invention. As explained above, a subscriber profile, shown in this example as a profile database 201, is updated based on location information 203 that is obtained through a locator device 113 (FIG. 1). Under this scenario, the subscriber may modify the subscriber profile via a web-based interface. The profile database 201 may be accessed through the Internet 205, or any other data network, using a client station 207, which is configured to run a web browser.

Through the web browser, the client station 207 may elect to modify (i.e., add, edit, or delete) the list of locations, the mapping of the geographic location of these locations (e.g., the subscriber has moved), and the devices associated with the respective locations. Furthermore, the subscriber may override the locator device 113 by specifying the current location. In an exemplary embodiment, the subscriber may indicate to the profile database 201 that he/she is at home.

Consequently, the current address should correspond to home. This setting may revert to automatic update after a specified period. The automatic update process is more fully described below with respect to FIG. 3.

Figure 3:
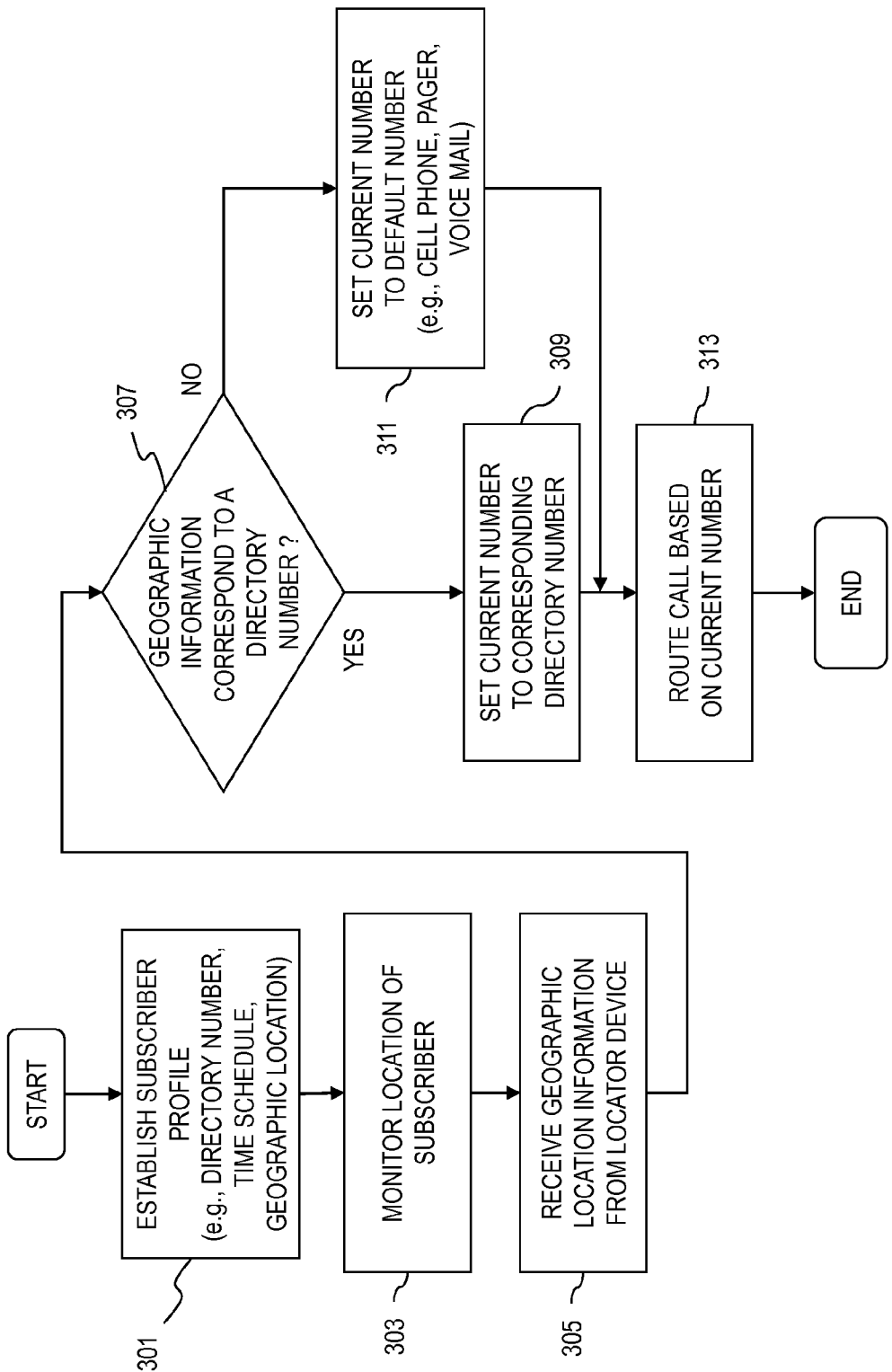
FIG. 3 is a flow chart of a process for automatically updating a subscriber profile information, according to an embodiment of the present invention.

FIG. 3 is a flow chart of a process for automatically updating user profile information, according to an embodiment of the present invention. In step 301, a subscriber profile is established and specifies a variety of call treatments; for example, a prioritized list of directory numbers (i.e., addresses) corresponding to various locations (e.g., home, office, etc.). The mapping from geographic information may be provided by the location information 203 or implemented as part of the profile database 201. In this example, it is assumed that this mapping logic exists within the profile database 201 (e.g., SDP 109c). Further, the subscriber profile may also capture requirements regarding scheduling (e.g., time-of-day, time-of-week, etc.) with respect to the locations.

In step 303, the location of the subscriber, via the locator device 113, is monitored, either by the device 113 itself or an external process, such as a location server (not shown) coupled to the location database 103. The locator device 113 outputs geographic location information, which ultimately is received, as in step 305, by the SDP 109c, in response to the positional information from the GPS satellites 115. In step 307, it is determined whether the geographic information corresponds to a directory number; if so, the current number (or address) is set to the corresponding directory number, per step 309. However, if the geographic information does not correspond to a specified directory number, the current number is set to a default number, which may specify a cellular phone, a pager, or a voice mail. Next, in step 313, the SCP 109a routes the call based on the updated subscriber profile.

The above approach advantageously provides the subscriber with an improved search type function over the traditional Find-Me/Follow-Me service, in that the subscriber profile permits accurate location of the subscriber. As a result, network resources are not unnecessarily expended to locate the subscriber. In addition, assuming the default number is the subscriber's cellular phone number, the use of the cellular phone is minimized as the subscriber would likely be located prior to reaching the default number in the call processing.

Figure 4:
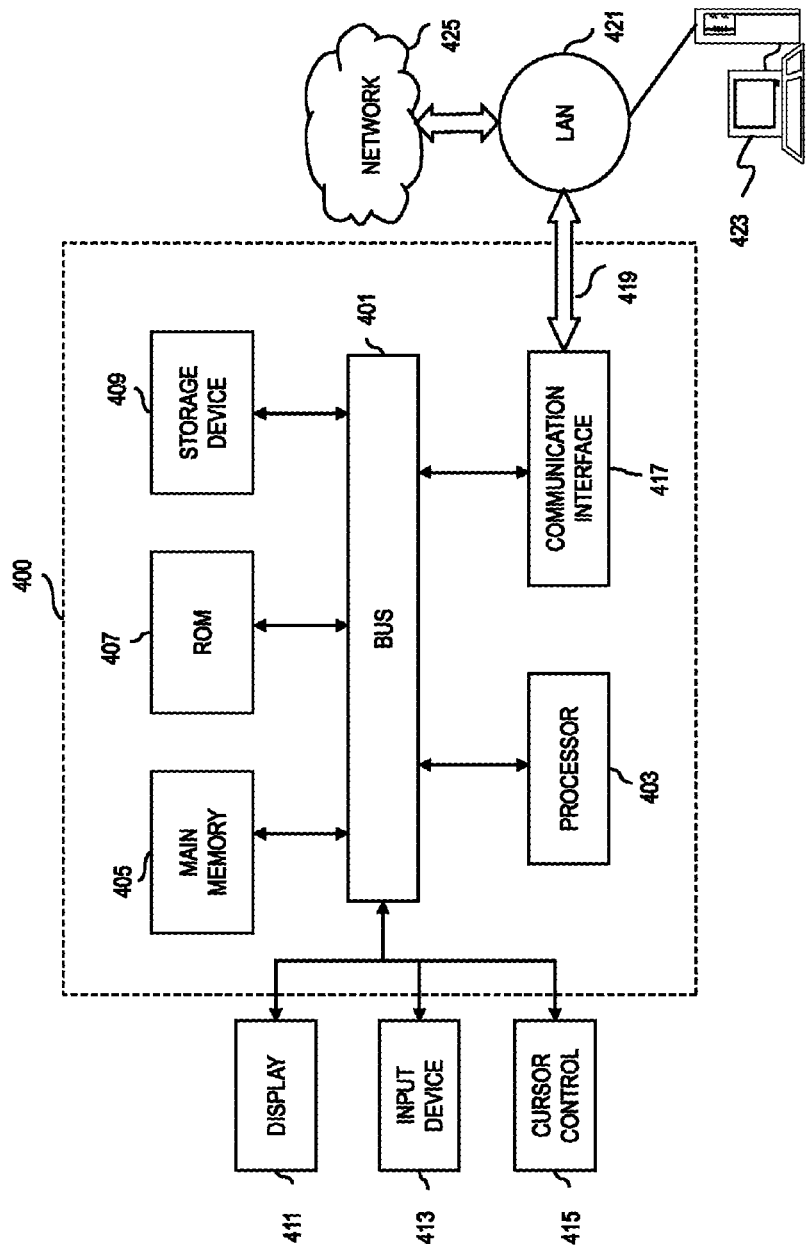
FIG. 4 is a diagram of a computer system that can be used to implement an embodiment of the present invention.

FIG. 4 illustrates a computer system 400 upon which an embodiment according to the present invention can be implemented. The computer system 400 includes a bus 401 or other communication mechanism for communicating information and a processor 403 coupled to the bus 401 for processing information. The computer system 400 also includes main memory 405, such as a random access memory (RAM) or other dynamic storage device, coupled to the bus 401 for storing information and instructions to be executed by the processor 403. Main memory 405 can also be used for storing temporary variables or other intermediate information during execution of instructions by the processor 403. The computer system 400 may further include a read only memory (ROM) 407 or other static storage device coupled to the bus 401 for storing static information and instructions for the processor 403. A storage device 409, such as a magnetic disk or optical disk, is coupled to the bus 401 for persistently storing information and instructions.

The computer system 400 may be coupled via the bus 401 to a display 411, such as a cathode ray tube (CRT), liquid crystal display, active matrix display, or plasma display, for displaying information to a computer user. An input device 413, such as a keyboard including alphanumeric and other keys, is coupled to the bus 401 for communicating information and command selections to the processor 403. Another type of user input device is a cursor control 415, such as a mouse, a trackball, or cursor direction keys, for communicating direction information and command selections to the processor 403 and for controlling cursor movement on the display 411.

According to one embodiment of the invention, the process of FIG. 3 is provided by the computer system 400 in response to the processor 403 executing an arrangement of instructions contained in main memory 405. Such instructions can be read into main memory 405 from another computer-readable medium, such as the storage device 409. Execution of the arrangement of instructions contained in main memory 405 causes the processor 403 to perform the process steps described herein. One or more processors in a multi-processing arrangement may also be employed to execute the instructions contained in main memory 405. In alternative embodiments, hard-wired circuitry may be used in place of or in combination with software instructions to implement the embodiment of the present invention. Thus, embodiments of the present invention are not limited to any specific combination of hardware circuitry and software.

The computer system 400 also includes a communication interface 417 coupled to bus 401. The communication interface 417 provides a two-way data communication coupling to a network link 419 connected to a local network 421. For example, the communication interface 417 may be a digital subscriber line (DSL) card or modem, an integrated services digital network (ISDN) card, a cable modem, a telephone modem, or any other communication interface to provide a data communication connection to a corresponding type of communication line. As another example, communication interface 417 may be a local area network (LAN) card (e.g. for Ethernet™ or an Asynchronous Transfer Model (ATM) network) to provide a data communication connection to a compatible LAN. Wireless links can also be implemented. In any such implementation, communication interface 417 sends and receives electrical, electromagnetic, or optical signals that carry digital data streams representing various types of information. Further, the communication interface 417 can include peripheral interface devices, such as a Universal Serial Bus (USB) interface, a PCMCIA (Personal Computer Memory Card International Association) interface, etc. Although a single communication interface 417 is depicted in FIG. 4, multiple communication interfaces can also be employed.

The network link 419 typically provides data communication through one or more networks to other data devices. For example, the network link 419 may provide a connection through local network 421 to a host computer 423, which has connectivity to a network 425 (e.g. a wide area network (WAN) or the global packet data communication network now commonly referred to as the "Internet") or to data equipment operated by a service provider. The local network 421 and network 425 both use electrical, electromagnetic, or optical signals to convey information and instructions. The signals through the various networks and the signals on network link 419 and through communication interface 417, which communicate digital data with computer system 400, are exemplary forms of carrier waves bearing the information and instructions.

The computer system 400 can send messages and receive data, including program code, through the network(s), network link 419, and communication interface 417. In the Internet example, a server (not shown) might transmit requested code belonging an application program for implementing an embodiment of the present invention through the network 425, local network 421 and communication interface 417. The processor 403 may execute the transmitted code while being received and/or store the code in storage device 49, or other non-volatile storage for later execution. In this manner, computer system 400 may obtain application code in the form of a carrier wave.

The term "computer-readable medium" as used herein refers to any medium that participates in providing instructions to the processor 405 for execution. Such a medium may take many forms, including but not limited to non-volatile media, volatile media, and transmission media. Non-volatile media include, for example, optical or magnetic disks, such as storage device 409. Volatile media include dynamic memory, such as main memory 405. Transmission media include coaxial cables, copper wire and fiber optics, including the wires that comprise bus 401. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Accordingly, the present invention provides an approach for automatically updating a profile to locate a subscriber to establish a communication session. The profile is utilized by a network search type service, such as Find-Me/Follow-Me, to route calls to a device accessible to the subscriber for at a particular location and time. A portable subscriber locator device that is attached to the subscriber transmits location information to a network that maintains the subscriber profile. The locator device, according to one embodiment of the present invention, employs GPS satellites to determine the position of the subscriber. The subscriber profile may be updated in real-time to track the location of the subscriber. The above approach advantageously enhances availability of the subscriber, while efficiently utilizing network resources.

While the present invention has been described in connection with a number of embodiments and implementations, the present invention is not so limited but covers various obvious modifications and equivalent arrangements, which fall within the purview of the appended claims.

What is claimed is:

1. A method comprising:
presenting, via graphical user interface, information relating to a user profile;
specifying one or more addresses for the user profile, wherein the addresses include a current address, wherein the user profile is used to route a call to the current address in response to location information associated with one of the addresses, the location information being updated without user input; and
inputting, via the graphical user interface, new location information to override the location information to alter the routing of the call.

2. A method according to claim 1, further comprising:
invoking a web-based application to provide the graphical user interface.

3. A method according to claim 2, wherein the override is activated for predetermined time period, and the current address reverts to the updating without user input.

4. A method according to claim 1, further comprising:
modifying, via the graphical user interface, the user profile with respect to the addresses, a mapping of the addresses to one or more devices configured to receive the call, or a combination thereof, and wherein the addresses are associated with one or more devices adapted to complete the call.

5. A method according to claim 1, wherein the location information includes or is determined from Global Positioning System (GPS) data.

6. A method according to claim 1, wherein the call is routed according to a search-type call treatment.

7. A method according to claim 1, wherein the user profile is maintained by a service data point of a telephony signaling network.

8. An apparatus comprising:
at least one processor; and
at least one memory including computer program code for one or more programs, the at least one memory and the computer program code configured to, with the at least one processor, cause the apparatus to perform at least the following,
present, via graphical user interface, information relating to a user profile, specify one or more addresses for the user profile, wherein the addresses include a current address, wherein the user profile is used to route a call to the current address in response to location information associated with one of the addresses, the location information being updated without user input, and
input, via the graphical user interface, new location information to override the location information to alter the routing of the call.

9. An apparatus according to claim 8, wherein the apparatus is further caused to:
invoke a web-based application to provide the graphical user interface.

10. An apparatus according to claim 9, wherein the override is activated for predetermined time period, and the current address reverts to the updating without user input.

11. An apparatus according to claim 8, wherein the apparatus is further caused to:
modify, via the graphical user interface, the user profile with respect to the addresses, a mapping of the addresses to one or more devices configured to receive the call, or a combination thereof, and wherein the addresses are associated with one or more devices adapted to complete the call.

12. An apparatus according to claim 8, wherein the location information includes or is determined from Global Positioning System (GPS) data.

13. An apparatus according to claim 8, wherein the call is routed according to a search-type call treatment.

14. An apparatus according to claim 8, wherein the user profile is maintained by a service data point of a telephony signaling network.

15. A system comprising:
- a first communication node configured to maintain a user profile specifying a plurality of addresses including a current address; and
- a second communication node configured to form a signaling network with the first communication node and to access the user profile to route a call to the current address in response to location information associated with one of the addresses, the location information being updated without user input, and wherein the second communication node being further configured to override the location information with new location information to alter the routing of the call.

16. A system according to claim 15, wherein the first communication node includes a service data point, and the second communication node includes a switching control point.

17. A system according to claim 16, further comprising:
- a switch configured to communicate with the switching control point and to route the call according to the user profile.

18. A system according to claim 15, wherein the user profile is provided as part of a subscription service that assigns a toll-free number for the call to be routed according to the user profile.

19. A system according to claim 15, further comprising:
- a portal configured to provide a web-based interface for a user to specify the user profile.

20. A system according to claim 15, wherein the call is a voice over internet protocol call.

* * * * *